(12) United States Patent
Rozen et al.

(10) Patent No.: US 8,832,629 B2
(45) Date of Patent: Sep. 9, 2014

(54) METHOD FOR OPTIMISING CELL VARIANT SELECTION WITHIN A DESIGN PROCESS FOR AN INTEGRATED CIRCUIT DEVICE

(75) Inventors: Anton Rozen, Gedera (IL); Michael Priel, Hertzelia (IL); Yaakov Seidenwar, Netanya (IL)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/811,400

(22) PCT Filed: Jul. 23, 2010

(86) PCT No.: PCT/IB2010/053362
§ 371 (c)(1),
(2), (4) Date: Jan. 22, 2013

(87) PCT Pub. No.: WO2012/010934
PCT Pub. Date: Jan. 26, 2012

(65) Prior Publication Data
US 2013/0125077 A1    May 16, 2013

(51) Int. Cl.
*G06F 17/50* (2006.01)
*H01L 27/118* (2006.01)

(52) U.S. Cl.
CPC ........ *G06F 17/5072* (2013.01); *G06F 17/5077* (2013.01); *H01L 27/118* (2013.01); *G06F 17/505* (2013.01)
USPC .......................................... 716/119; 716/126

(58) Field of Classification Search
CPC ............ G06F 17/5068; G06F 17/5072; G06F 17/5077; G06F 17/5045; G06F 17/5081; G06F 17/5054; H05K 3/0005
USPC ................................. 716/119, 126
See application file for complete search history.

(56) References Cited

U.S. PATENT DOCUMENTS

| | | | |
|---|---|---|---|
| 5,953,236 A | 9/1999 | Hossain et al. | |
| 6,901,571 B1 | 5/2005 | Petranovic et al. | |
| 7,448,009 B2 | 11/2008 | Pundoor | |
| 2003/0188268 A1* | 10/2003 | Konstadinidis et al. | 716/2 |
| 2006/0101355 A1 | 5/2006 | Ciplickas et al. | |
| 2007/0094623 A1 | 4/2007 | Chen et al. | |
| 2008/0320420 A1* | 12/2008 | Sferrazza | 716/2 |
| 2009/0210847 A1* | 8/2009 | Manohar et al. | 716/12 |
| 2009/0288056 A1* | 11/2009 | Gitchev et al. | 716/12 |
| 2010/0107133 A1* | 4/2010 | Nakagawa et al. | 716/5 |
| 2010/0205571 A1* | 8/2010 | Manohar et al. | 716/3 |

FOREIGN PATENT DOCUMENTS

EP    1862926 A3    6/2010

OTHER PUBLICATIONS

International Search Report and Written Opinion correlating to PCT/IB2010/053362 dated Mar. 22, 2011.

* cited by examiner

*Primary Examiner* — Stacy Whitmore
*Assistant Examiner* — Magid Dimyan

(57) ABSTRACT

A method is provided for optimising cell variant selection within a design process for an integrated circuit device. The method comprises performing cell placement and signal routing for an integrated circuit being designed using default cell layout information for cell variants of at least one cell type. The method further comprises performing cell variant optimization comprising identifying at least one cell of the at least one cell type to be substituted and substituting a default cell variant of the at least one identified cell with an alternative variant of the at least one identified cell. The method further comprises, during cell optimization, configuring a pin interconnect modification for mapping at least one pin location of the alternative variant of the at least one identified cell to at least one pin contact for the default cell layout.

16 Claims, 2 Drawing Sheets

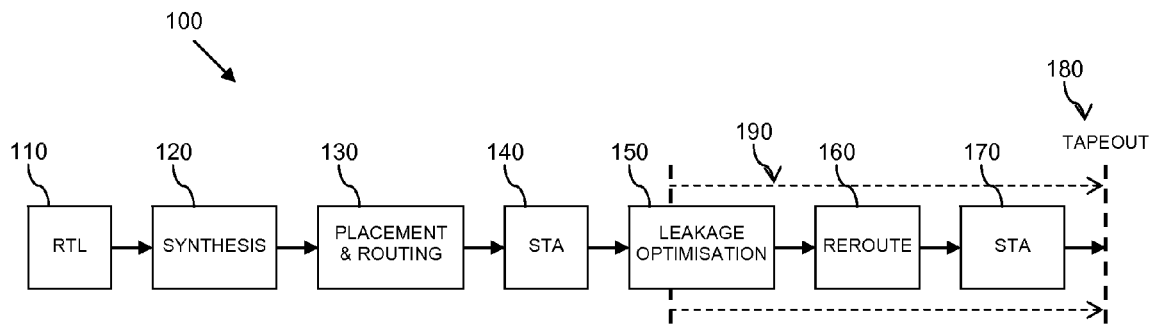
FIG. 1
(Prior Art)
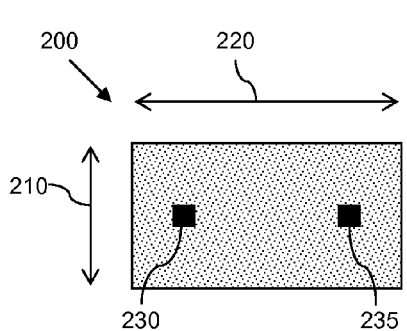
FIG. 2
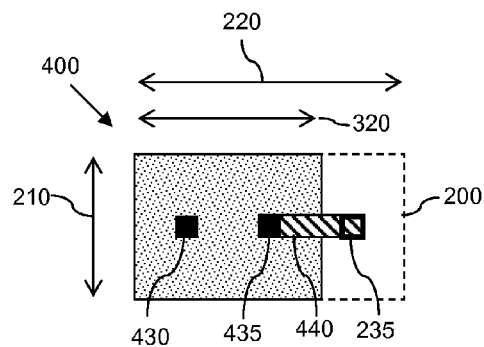
FIG. 4
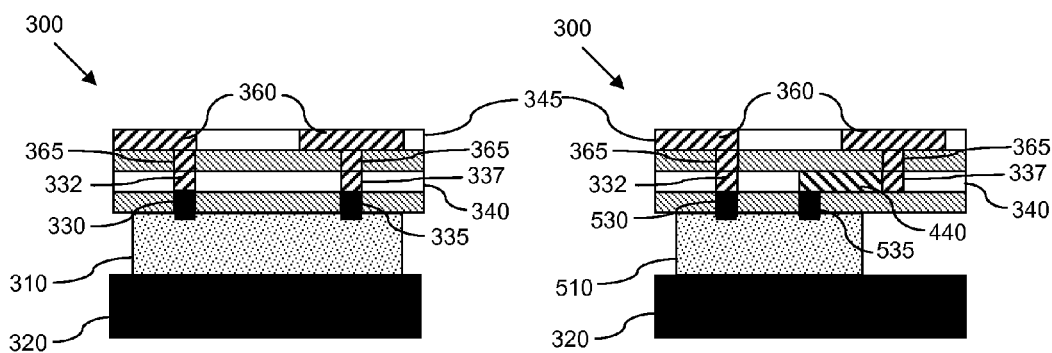
FIG. 3
FIG. 5

METHOD FOR OPTIMISING CELL VARIANT SELECTION WITHIN A DESIGN PROCESS FOR AN INTEGRATED CIRCUIT DEVICE

FIELD OF THE INVENTION

The field of this invention relates to a method for optimising cell variant selection within a design process for an integrated circuit device, and an integrated circuit thereby.

BACKGROUND OF THE INVENTION

FIG. 1 illustrates a typical example 100 of the main steps involved in integrated circuit (IC) design. The example illustrated in FIG. 1 starts with a generation 110 of a register transfer level (RTL) description for an operation of an IC being designed. In the RTL description, a circuit's behaviour is defined in terms of a flow of signals (or transfer of data) between, say, hardware registers, and the logic operations performed on those signals. Logic synthesis 120 is then performed, whereby the RTL description is mapped into a cell-level net list in the target technology. Placement and routing 130 of the cells in the net list is then performed, where the cells are assigned to non-overlapping locations on the die area, and the interconnecting tracks are routed through the various layers of the semiconductor die. Static timing analysis (STA) 140 is then performed to verify that all signals will arrive within their intended time frames, and to detect possible 'hold time' violations, setup time violations, slow paths, clock skew, etc. Once static timing analysis has been performed, post routing leakage optimisation 150 is performed. Post routing leakage optimisation comprises identifying timing paths with positive slack and attempts to reduce current leakage on that path without creating a timing violation.

During logic synthesis 120, the RTL description is mapped into a cell-level net list by selecting appropriate cells from one or more libraries of cells. A typical standard cell definition library is a collection of low-level logic functions, such as AND, OR INVERT, flip-flops, latches, buffers, etc. These cells are realized as fixed height, variable width cells. A key aspect with these libraries is that they are of a fixed height, which enables them to be placed in rows, easing the process of automated layout. Each library typically contains multiple implementations of the same logic function(s), with each cell of a specific logic function differing in area (width) and speed. In order to achieve optimal performance for an IC that is being designed, it is generally the case that high speed cells, for example relatively large, low threshold voltage cells, are selected during logic synthesis as the initial, default cells. The advantage of using such high speed cells as the initial default cells is that they provide high performance and thereby enable higher operating frequencies of the integrated circuit. However, a drawback of low voltage threshold cells is that they generally suffer from high leakage currents. With the continued progress in process scaling, leakage power consumption has become an increasingly important factor in the overall power consumption of an integrated circuit device. Reducing the leakage power consumption (and thereby the overall power consumption) of an integrated circuit device is important for a number of reasons, including: lower requirements for external power supplies; more compact SoC (System on Chip) power grid, which in turn leads to higher routing resources, reduced die size and thereby a cheaper product; reduced power dissipation requirements for the IC package, and thereby cheaper packaging; etc.

Thus, a net result of reducing the leakage power consumption of an integrated circuit device is not just of reduced overall power consumption of the device, but also a significantly cheaper cost of materials for customers. Thus, the step of leakage optimisation 150 is an increasingly important part of the integrated circuit design process. Post routing leakage optimisation is particularly important in terms of reducing leakage power consumption, without impacting on the performance or operation of the integrated circuit device, and is typically performed in addition to other power reduction techniques, such as lowering stand-by voltages, performance versus process and temperature compensation, power gating and state retention power gating techniques, back biasing, etc.

Typically, post routing leakage optimisation involves identifying timing paths with positive adjustable margin, and substituting one or more cells within those timing paths with lower leakage cells of the same type. Although the lower leakage cells are 'slower' in terms of their propagation times (e.g. a length of time from receiving a signal to that signal propagating there through and its product being presented at an output thereof), the positive adjustable margins of the identified timing path enables such substitutions to be made without causing a timing violation.

Generally, such post routing leakage optimisation comprises substituting one or more cells within an identified timing path with:
 (i) smaller (i.e. reduced transistor width) versions of the one or more cell(s) creating the timing problem; and/or
 (ii) higher voltage threshold versions of the cells(s).

A problem with this approach is that, due to the different size of the cells, it is necessary for the tracks corresponding to the substituted cells to be re-routed, as illustrated at re-routing step 160 in FIG. 1, and for static timing analysis to be repeated 170. The need to perform re-routing 160 and thereafter to repeat the static timing analysis 170 means that the date on which tapeout 180 may be achieved (i.e. the final result of the design cycle for the IC, where the artwork for the photomask of the IC is sent for manufacture) is significantly delayed, as illustrated generally at 190. Any such delay in the development of a product is undesirable.

To overcome the problem of needing to perform re-routing 160 and to repeat static timing analysis 170, it is known for the step of post routing leakage optimisation to only comprise substituting one or more cells within an identified timing path with cells comprising higher voltage thresholds, since such cells are typically of the same size (width) as the lower voltage threshold versions of the same cell. Accordingly, the need for re-routing may be avoided. However, whilst substituting higher voltage threshold cells does enable leakage current to be reduced without the need for perform rerouting 160 and to repeat static timing analysis 170, further reductions in the leakage currents of cells within identified timing paths is desirable.

SUMMARY OF THE INVENTION

The present invention provides a method for optimising cell variant selection within a design process for an integrated circuit device, and an integrated circuit created by way of a process comprising such a method, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 1 illustrates an example of the main steps involved in integrated circuit design.

FIG. 2 illustrates a simplified plan view of an example of a cell footprint.

FIG. 3 illustrates a simplified cross-sectional view of an example of cell.

FIG. 4 illustrates a simplified plan view of an alternative example of a cell footprint.

FIG. 5 illustrates a simplified cross-sectional view of an alternative example of a cell.

DETAILED DESCRIPTION

Figure 6:
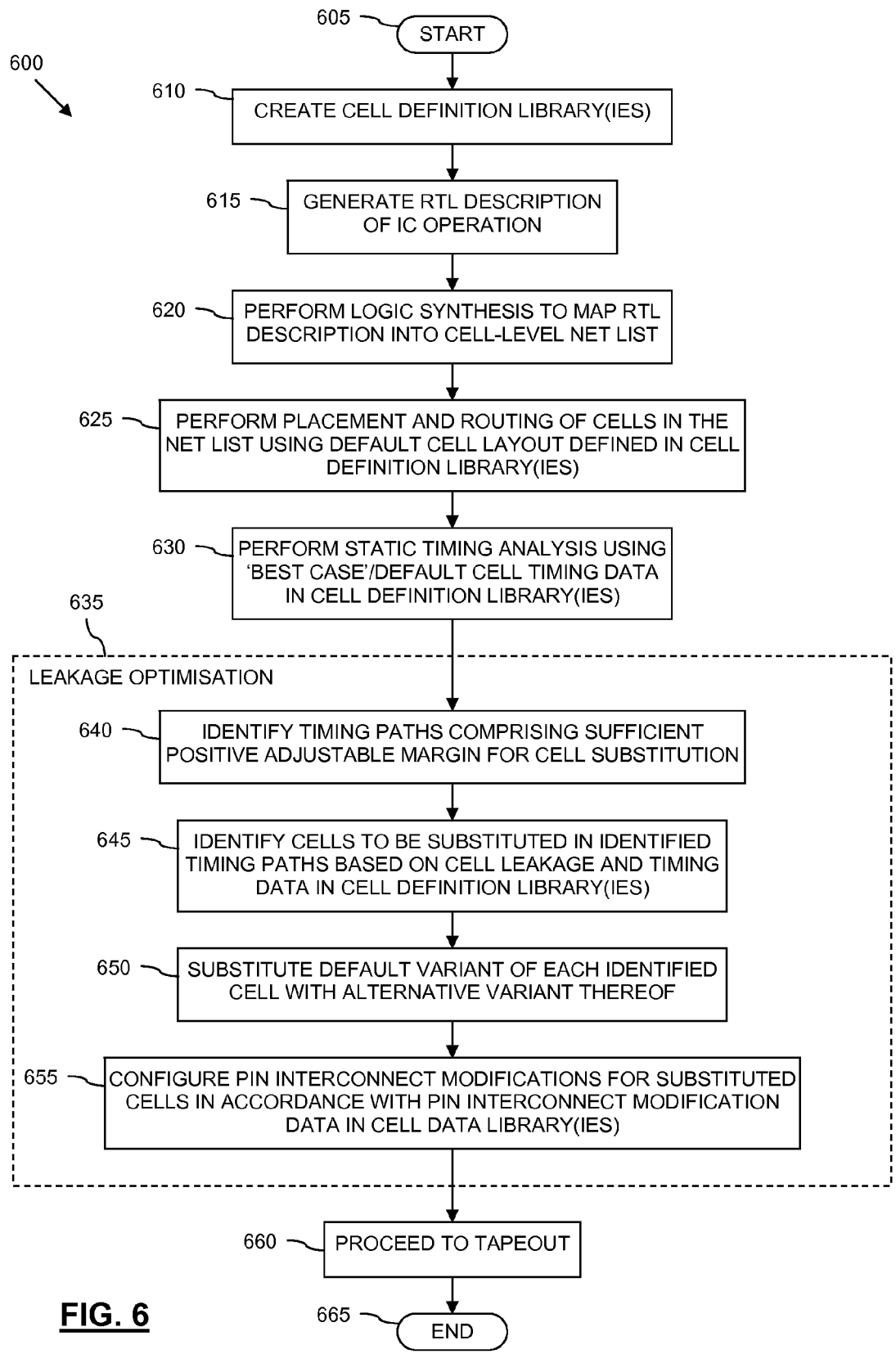
FIG. 6 illustrates an example of a simplified flowchart of a method for optimising cell variant selection within a design process for an integrated circuit device.

Because the illustrated embodiments of the present invention may for the most part, be implemented using electronic components and circuits known to those skilled in the art, details will not be explained in any greater extent than that considered necessary as illustrated below for the understanding and appreciation of the underlying concepts of the present invention and in order not to obfuscate or distract from the teachings of the present invention.

Integrated circuit design may typically comprise generating a register transfer level (RTL) description for the operation of an IC being designed. Logic synthesis may then be performed, where the RTL description is mapped into a cell-level net list in the target technology. Placement and routing of the cells in the net list may then performed, where the cells are assigned to non-overlapping locations on the die area, and the interconnecting tracks are routed through the various layers of the semiconductor die. A typical cell comprises a group of transistor and interconnect structures that provide one or more Boolean logic functions (such as AND, OR, XOR, inverters, etc.) or storage functions (such as flip-flops, latches, etc.). Static timing analysis (STA) may then be performed to verify that all signals will arrive within their intended time frames, and to detect possible hold time violations, setup time violations, slow paths, clock skew, etc. Once static timing analysis has been performed, post routing leakage optimisation may be performed to reduce current leakage on that path without creating a timing violation.

In accordance with an example embodiment of the present invention, there is provided a method for optimising cell variant selection within such a design process for an integrated circuit (IC) device. The method comprises performing placement and routing using default cell layout information for cell variants of at least one cell type, and performing cell variant optimisation comprising identifying at least one cell to be substituted and substituting a default cell variant of the at least one identified cell with an alternative variant of the at least one identified cell. The method further comprises, during cell optimisation, configuring a pin interconnect modification for mapping at least one pin location of the alternative variant of the at least one identified cell to at least one pin contact for the default cell layout.

FIG. 2 illustrates a simplified plan view of an example of a 'footprint' 200 for a cell, and in particular the example of FIG. 2 illustrates a footprint of a default variant of a cell type; the cell footprint 200 of the default cell variant having a height 210 and a width 220. The cell footprint 200 of the default cell variant further comprises pin locations 230, 235, aligned with input/output pins of the cell, and where pin contacts are required to be provided within the integrated circuit device to electrically couple the input/output pins of the cell to other components.

FIG. 3 illustrates a simplified cross-sectional view of an example of a cell 310 for the footprint 200 of FIG. 2 within an integrated circuit device 300. The cell 310 comprises a polysilicon structure made up of transistors and other electronic components. mounted on a silicon bulk layer 320. For the illustrated example, the cell 310 comprises two input/output pins, illustrated at 330, 335 and generally aligned with the pin locations 230, 235 of the footprint 200 illustrated in FIG. 2. The integrated circuit device 300 further comprise various metal layers 340, 345 from which conductive tracks 360 are 'etched' to provide routing of electrical signals, including pin contacts 332, 337 within the metal layer 340 adjacent the polysilicon structure of the cell 310, and substantially aligned with the pin locations 230, 235. The integrated circuit device 300 further comprises dielectric layers 350, 355 separating the metal layers 340, 345 and the polysilicon structure of the cell 310. Conductive 'vias' or 'plugs' 365 are provided through the dielectric layers to electrically couple adjacent metal layers 340, 345.

FIG. 4 illustrates a simplified plan view of a footprint 400 for an alternative cell, and in particular of an alternative cell variant of the same cell type to the default cell of FIGS. 2 and 3. As is known, cells typically comprise a fixed height which enables them to be placed in uniform rows, thereby easing the process of automated layout. Accordingly, the footprint 400 of the alternative cell variant comprises the same height 210 as that of the footprint 200 for the default variant. However, the alternative cell variant comprises a smaller (i.e. reduced transistor width) version of the default cell providing improved (reduced) leakage current properties. Accordingly, the area occupied by the alternative cell variant comprises a reduced width 320 as compared to the width 220 of the default cell variant. The cell footprint 400 of the alternative cell variant also comprises pin locations 430, 435, aligned with input/output pins of the alternative cell variant. As illustrated in FIG. 4, one or more of the pin locations 435 for the alternative cell variant may differ to the corresponding pin locations 235 of the default cell 300 of FIGS. 2 and 3.

In accordance with some examples within a design process for an integrated circuit device, placement and routing of cells within a net list for the integrated circuit device is performed using default cell layout information for cell variants of at least one cell type. Such a default cell layout may comprise information defining the default cell footprint 200 illustrated in FIG. 2. The design process of one example embodiment may then comprise performing cell variant optimisation, whereby at least one cell to be substituted is identified, and a default cell variant of the identified cell(s) is(are) substituted with an alternative variant thereof. Thus, a default cell, such as the default cell 310 of FIGS. 2 and 3, may be substituted with an alternative cell variant, such as an alternative cell variant to which the footprint 400 of FIG. 4 relates. The alternative cell variant may comprise a variant of the cell that varies from the default cell solely by virtue of comprising transistor elements, etc. having a higher voltage threshold than those of the default variant.

Cell variants that differ only by virtue of voltage thresholds, typically comprise similar footprints, and as such substituting one for another is a straightforward matter of re-using the same footprint. In this manner, a decrease in the current leakage may be achieved without a need for any subsequent re-routing or further significant static timing analysis. As illustrated in FIG. 4, such smaller cell variants comprise a reduced width 320, as compared to that of a default cell variant 220, and one or more of the pin locations 435 for the alternative cell variant differ to the corresponding pin locations 235 of the default cell 300 of FIGS. 2 and 3. Accordingly, unlike for prior art procedures, following such a substitution it is no longer necessary to perform re-routing in order to 'realign' pin contacts within the integrated circuit device with the input/output pins of the substituted smaller cells.

However, in accordance with some examples, during cell optimisation, pin interconnect modifications are configured for mapping pin locations 435 of the alternative cell variant to the corresponding pin locations 235 of the default cell variant where such pin locations 435, 235 differ. For example, in FIG. 4 there is illustrated a pin interconnect modification 440 that has been configured to provide an electrical connection between a pin location 435 of the alternative cell variant and a pin location 235 of the default cell variant. In this manner, an alternative cell variant comprising a footprint different to that of the default cell variant may be substituted during cell optimisation, whilst reusing the 'modified' default cell footprint. As a result, re-routing is not required since the pin locations of the alternative cell variant have been mapped to the default cell footprint, thereby enabling the default pin locations to be reused. Since the size of the cell has changed, in this example, there may be some additional input/output capacitance. Accordingly, it may be necessary in some examples to perform some incremental timing checks. However, such timing checks are likely to be significantly less onerous than full static timing analysis that would be required following re-routing as required in prior art techniques.

FIG. 5 illustrates a simplified cross-sectional view of a cell 510 within the integrated circuit device 300 for the footprint 400 of FIG. 4 following cell optimisation. The cell 510 comprises a smaller variant of the default cell 310 of FIG. 3. For the illustrated example, the cell 510 comprises two input/output pins, illustrated at 530, 535 and generally aligned with the pin locations 430, 435 of the footprint 400 illustrated in FIG. 4. The conductive tracks 360 of the integrated circuit device remain 'etched' to provide the same routing as for the default cell variant 310 illustrated in FIG. 4, including the pin contacts 332, 337 at the pin locations 230, 235 of the default cell footprint 200 within the metal layer 340 adjacent the polysilicon structure of the cell 510.

For the illustrated example, the cell 510 has been located such that the input/output pin 530 thereof substantially aligns with a corresponding pin contact 332 within the integrated circuit device 300. However, because of the difference in size between the alternative cell variant 510 and the default cell variant 310, the input/output pin 535 is not aligned with the corresponding pin contact 337. However, pin interconnect modification track 440, which for the illustrated example comprises a connecting strip within the metal layer 340 adjacent the polysilicon structure of the cell 510 is configured between the pin location 435 of the alternative cell variant and the corresponding pin location 235 of the default cell footprint 200. In this manner, the pin interconnect modification track 440 electrically couples the input/output pin 535 of the alternative cell variant 510 to the pin contact 337 for the default cell footprint 300.

Typically, the 'lower' metal layer 340 adjacent the polysilicon structure of cells (often referred to as 'Metal Layer 1') is almost solely used for providing pin contacts to those cells, such as the pin contacts 332, 337 illustrated in FIGS. 3 and 5, with the routing of signals being typically performed within 'higher' metal layers within the integrated circuit device, such as layer 345. Accordingly, configuring pin interconnect modifications in the form of connecting strips within the 'lower' metal layer 340 is a relatively simple matter, and typically does not interfere with the routing of signals.

Referring now to FIG. 6, there is illustrated an example of a simplified flowchart 600 of a method for optimising cell variant selection within a design process for an integrated circuit device. The method starts at 605, and moves on to step 610 with a creation of one or more cell definition libraries. Such a cell definition library may comprise, say, cell layout information for one or more cells for example in a library exchange format (LEF), timing, power and noise information for the one or more cells, etc. Next, at step 615, a register transfer level (RTL) description may be generated for an operation of an integrated circuit device that is being designed. Logic synthesis may then be performed, in step 620, where the RTL description is mapped into a cell-level net list in the target technology. Placement and routing of the cells in the net list may then be performed in step 630, where the cells are assigned to non-overlapping locations on the die area of the integrated circuit device. Such placement and routing may be performed using cell layout information defined within the cell definition library(ies) defined in step 610.

In particular for some example embodiments, placement and routing may be performed using default cell layout information for one or more types of cell defined within the cell definition library(ies). Such default cell layout information for a cell type may comprise cell layout information for a default cell variant of that cell type, for example information relating to a default cell variant footprint, such as the default cell footprint 200 illustrated in FIG. 2. Such a default cell variant may comprise a 'large' (i.e. high transistor width) and low voltage threshold variant of the cell type for providing high performance. Alternatively, such default cell layout information may comprise generic ('Virtual') cell layout information for a cell type, for example information relating to a generic ('Virtual') cell footprint for that cell type. Such a generic cell footprint may be based on the cell footprint for a default variant cell for that cell type.

Static timing analysis is then performed at step 630 using timing information defined within the cell definition library(ies). For example, such static timing analysis may be performed using timing information for default cell variants. Again, such a default cell variant may comprise a 'large' (i.e. high transistor width) and low voltage threshold variant of the cell type for providing high performance. In this manner, by performing such static timing analysis using timing information for such default cell variants, static timing analysis may be performed for 'best case' cell variants.

Having performed the static timing analysis, leakage optimisation in accordance with examples of the invention is then performed, as illustrated generally at 635. The leakage optimisation comprises identifying timing paths comprising sufficient positive adjustable margin for cell substitution in step 640. Such timing path identification may be based on information from the static timing analysis and/or based on additional/alternative timing computations, for example using timing information for cells defined within the cell definition library(ies).

Having identified one or more timing paths comprising sufficient positive adjustable margin for cell substitution, the method moves on to step 645 where one or more cells within each of the identified timing paths are identified to be substituted, for example based on cell leakage and timing data within the cell definition library(ies). Again, default cell variants may comprise 'large' (i.e. high transistor width) and low voltage threshold variants of the cell types for providing high performance, but which comprise high leakage currents.

Accordingly, substitution of cells in this step comprises substituting a high performance/high leakage current default variant of a cell with a lower performance/lower leakage current variant of that cell. In particular, such a substitution may comprise substituting a default cell variant with a smaller (i.e. lower transistor width) and/or higher voltage threshold variant. Although the lower leakage cells are 'slower', in terms of their propagation times (e.g. the length of time from receiving a signal to that signal propagating there through and its product being presented at an output thereof), the positive adjustable margin of the identified timing path enables such substitutions to be made without causing a timing violation in the design process. For example, the cell definition library(ies) may comprise cell timing information for a default variant of a cell type comprising, say, propagation times for that default cell variant. The cell definition library (ies) may further comprise cell timing information for one or more alternative variants of that cell type comprising, say, propagation times for the one or more alternative cell variants. Alternatively, the cell definition library(ies) may comprise cell timing information for one or more alternative variants of that cell type comprising a timing delta value for each of the one or more alternative cell variants, whereby each timing delta value provides, say, a propagation time difference for the respective alternative cell variant with respect to the propagation time for the default cell variant. Such timing information may be used to identify those cells that may be substituted without causing a timing violation.

Having identified one or more cells to be substituted, the method moves on to step 650 where default (high performance) variants of the identified cells are substituted with alternative (lower leakage current) variants thereof. Pin interconnect modifications, for example such as the pin interconnect modification track 440 illustrated in FIGS. 4 and 5, are then configured for the substituted cells at 655. For example, in accordance with some examples pin interconnect modifications for one or more cell variants of a cell type may be defined within the cell definition library(ies). In this manner, during cell optimisation a pin interconnect modification for an alternative variant of a substituted cell may be configured as defined within the cell definition library(ies). The cell definition library(ies) may comprise cell layout information for the default cell variant and for one or more alternative cell variants, with the cell layout information for the one or more alternative cell variants comprising pin interconnect modification information therefor. Alternatively, the cell definition library(ies) may comprise cell layout information for the default cell variant, and one or more pin interconnect modifications relative to the default cell layout for each alternative cell variant.

Having performed the leakage optimisation at 635, the method moves on to tapeout at step 660, where the artwork for the photomask of the integrated circuit device may be sent for manufacture. The design method then ends at step 665. It will be apparent that the design method may be part of a method of manufacturing an integrated circuit and that after the end of the design method, the integrated circuit may be manufactured in accordance with the artwork for the photomask.

As will be appreciated from the illustrated examples and the respective description thereof above, the proposed solution enables cell-resizing to be performed whilst preserving the initial routing by configuring the pin interconnect modifications to adapt the default cell layouts to accommodate the re-sized cell variants. In this manner, substituted (re-sized) cells are able to reuse the default, large cell footprints, keeping the original size and pin placement.

In this manner, traditional re-routing operation is no longer required in the design process for the IS, particularly in large and/or complex IC designs. For example, if leakage optimization resulted in the size of, say, twenty thousand cells being decreased, then the pin locations for those twenty thousand cells would be altered, thereby requiring the positions of the electrical connections to those pins to be altered as well. However, by configuring pin interconnect modifications as described above, the need to alter the positions of the electrical connections to the pins of the substituted cells is substantially alleviated, and as such re-routing is not required.

The known technique for avoiding the need for re-routing and repeated static timing analysis following post routing leakage optimisation comprises only substituting cells with variants comprising higher voltage thresholds, since such cell variants are typically of the same size (width) as the default (lower voltage threshold) variants of the same cell. In tests, such a prior art technique provided a 17% reduction in current leakage for an integrated circuit device. In contrast, comparative tests for the aforementioned examples of the present invention, whereby post routing leakage optimisation was performed comprising down-sizing cells (e.g. substituting default variants with 'smaller' variants for those cells) showed a 24% reduction in current leakage. Furthermore, comparative tests for an alternative example embodiment of the present invention whereby post routing leakage optimisation was performed comprising substituting smaller and high voltage threshold variants showed a 27% reduction in current leakage; a 10% greater reduction than for the known prior art technique.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

Moreover, the terms "front," "back," "top," "bottom," "over," "under", "higher", "lower" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of generating a design for an integrated circuit device, the method comprising:
    performing, using a computer, cell placement and signal routing for the integrated circuit device being designed using default cell layout information for cell variants of at least one cell type; and
    performing cell variant optimization, wherein cell variant optimization comprises:
    identifying at least one cell of the at least one cell type to be substituted,
    substituting a default cell variant of the at least one identified cell with an alternative variant of the at least one identified cell, and
    during said performing cell variant optimisation, configuring a pin interconnect layout modification for mapping physical layout of at least one pin location of the alternative variant of the at least one identified cell to at least one pin contact for the default cell layout.

2. The method of claim 1 wherein the method further comprises:
    defining within at least one cell definition library a pin interconnect layout modification relative to the default cell layout for at least one variant of the at least one cell type; and
    during said performing cell variant optimisation, configuring the pin interconnect layout modification for the alternative variant of the at least one identified cell as defined within the at least one cell definition library.

3. The method of claim 2 wherein the method comprises defining, within at least one cell definition library, cell layout information for the default cell variant and at least one alternative cell variant of the at least one cell type, the cell layout information comprising pin interconnect layout modification information for the at least one alternative cell variant.

4. The method of claim 2 wherein the method comprises defining, within at least one cell definition library, cell layout information for the default cell variant, and further defining, within the at least one cell definition library, a pin interconnect layout modification relative to the default cell layout for each alternative cell variant.

5. The method of claim 1 wherein the method comprises defining, within the at least one cell definition library, cell timing information for the default variant of the at least one cell type and a timing delta value for the at least one alternative variant of the at least one cell type.

6. The method of claim 1 wherein configuring a pin interconnect layout modification comprises configuring at least one connecting strip within a metal layer of the integrated circuit device between at least one pin contact of an alternative cell variant and at least one corresponding pin location within the respective default cell layout.

7. The method of claim 6 wherein configuring a pin interconnect layout modification comprises configuring at least one connecting strip within a metal layer of the integrated circuit device adjacent a polysilicon structure of the cell.

8. The method of claim 1, further including manufacturing the integrated circuit in accordance with the design.

9. An integrated circuit device created by way of a process comprising the method for optimising cell variant selection of claim 1.

10. A non-transitory computer-readable storage medium having executable program code stored therein for optimising cell variant selection within a design process for an integrated circuit device, the program code operable for:

performing cell placement and signal routing for an integrated circuit being designed using default cell layout information for cell variants of at least one cell type; and performing cell variant optimization, wherein cell variant optimization comprises identifying at least one cell of the at least one cell type to be substituted, substituting a default cell variant of the at least one identified cell with an alternative variant of the at least one identified cell, and during said performing cell variant optimisation, configuring a pin interconnect layout modification for mapping physical layout of at least one pin location of the alternative variant of the at least one identified cell to at least one pin contact for the default cell layout.

11. The computer readable storage medium of claim 10, wherein the program code is further operable for:

defining within at least one cell definition library a pin interconnect layout modification relative to the default cell layout for at least one variant of the at least one cell type; and during said performing cell variant optimisation, configuring the pin interconnect layout modification for the alternative variant of the at least one identified cell as defined within the at least one cell definition library.

12. The computer readable storage medium of claim 11 wherein the program code is further operable for defining, within at least one cell definition library, cell layout information for the default cell variant and at least one alternative cell variant of the at least one cell type, the cell layout information comprising pin interconnect layout modification information for the at least one alternative cell variant.

13. The computer readable storage medium of claim 11 wherein the program code is further operable for defining, within at least one cell definition library, cell layout information for the default cell variant, and further defining, within the at least one cell definition library, a pin interconnect layout modification relative to the default cell layout for each alternative cell variant.

14. The computer readable storage medium of claim 10 wherein the program code is further operable for defining, within the at least one cell definition library, cell timing information for the default variant of the at least one cell type and a timing delta value for the at least one alternative variant of the at least one cell type.

15. The computer readable storage medium of claim 10 wherein the program code operable to configure a pin interconnect layout modification comprises further program code operable for configuring at least one connecting strip within a metal layer of the integrated circuit device between at least one pin contact of an alternative cell variant and at least one corresponding pin location within the respective default cell layout.

16. The computer readable storage medium of claim 15 wherein the program code operable to configure a pin interconnect layout modification comprises further program code operable for configuring at least one connecting strip within a metal layer of the integrated circuit device adjacent a polysilicon structure of the cell.

* * * * *